(12) United States Patent
Matsumoto et al.

(10) Patent No.: US 11,591,685 B2
(45) Date of Patent: Feb. 28, 2023

(54) MANUFACTURING METHOD OF GALVANNEALED STEEL SHEET

(71) Applicant: NIPPON STEEL CORPORATION, Tokyo (JP)

(72) Inventors: Yu Matsumoto, Tokyo (JP); Shigeru Hashimoto, Tokyo (JP); Koichi Nishizawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 385 days.

(21) Appl. No.: 16/759,275

(22) PCT Filed: Nov. 13, 2018

(86) PCT No.: PCT/JP2018/042026
§ 371 (c)(1),
(2) Date: Apr. 24, 2020

(87) PCT Pub. No.: WO2019/098206
PCT Pub. Date: May 23, 2019

(65) Prior Publication Data
US 2020/0325569 A1    Oct. 15, 2020

(30) Foreign Application Priority Data
Nov. 14, 2017    (JP) .............................. JP2017-219159

(51) Int. Cl.
*C23C 2/28*    (2006.01)
*C21D 9/46*    (2006.01)
(Continued)

(52) U.S. Cl.
CPC .............. *C23C 2/28* (2013.01); *B32B 15/013* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 6,180,171 B1    1/2001  Ota et al.
2014/0287263 A1  9/2014  Kawata et al.

FOREIGN PATENT DOCUMENTS

JP    2-145757 A    6/1990
JP    4-280953 A    10/1992
(Continued)

OTHER PUBLICATIONS

International Search Report for PCT/JP2018/042026 (PCT/ISA/210) dated Jan. 15, 2019.
(Continued)

*Primary Examiner* — Anthony M Liang
(74) *Attorney, Agent, or Firm* — Birch, Stewart, Kolasch & Birch, LLP

(57) ABSTRACT

[Object] What is provided is a manufacturing method of a galvannealed steel sheet capable of further promoting alloying of zinc plating with the steel sheet.
[Resolution Means] A manufacturing method of a galvannealed steel sheet, including: forming on a surface of a steel sheet after hot rolling and pickling which contains, by mass %, C: 0.001% to 0.350%, Si: 0.001% to 2.500% or P: 0.001% to 0.100%, or combination thereof, Mn: 0.10% to 3.00%, S: 0.001% to 0.010%, N: 0.0010% to 0.0065%, and sol. Al: 0.001% to 0.800% with a remainder being Fe and impurities, grooves having an opening surface width of 10 μm to 25 μm and a depth of 10 μm to 30 μm at intervals of 20 μm to 500 μm; cold rolling the steel sheet at a rolling reduction of 30% or more; reduction annealing the steel sheet after the cold rolling; immersing the steel sheet in a hot-dip galvanizing bath containing 0.10 mass % to 0.20 mass % of Al with a remainder consisting of Zn and optional
(Continued)

components, and adhering a hot-dip galvanized layer to the surface of the steel sheet; and heating the steel sheet to which the hot-dip galvanized layer is adhered, and alloying the steel sheet with the hot-dip galvanized layer.

12 Claims, 6 Drawing Sheets

(51) Int. Cl.
| | |
|---|---|
| C21D 8/02 | (2006.01) |
| C21D 6/00 | (2006.01) |
| C23C 2/02 | (2006.01) |
| C23C 2/06 | (2006.01) |
| C23C 2/40 | (2006.01) |
| C22C 38/04 | (2006.01) |
| C22C 38/02 | (2006.01) |
| C22C 38/00 | (2006.01) |
| C22C 38/06 | (2006.01) |
| C22C 38/14 | (2006.01) |
| C22C 38/12 | (2006.01) |
| C22C 38/16 | (2006.01) |
| B32B 15/01 | (2006.01) |
| C22C 18/04 | (2006.01) |
| C22C 38/08 | (2006.01) |

(52) U.S. Cl.
CPC .......... *C21D 8/0205* (2013.01); *C21D 8/0226* (2013.01); *C21D 8/0236* (2013.01); *C21D 8/0263* (2013.01); *C21D 9/46* (2013.01); *C22C 18/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C23C 2/02* (2013.01); *C23C 2/06* (2013.01); *C23C 2/40* (2013.01)

(56) References Cited

FOREIGN PATENT DOCUMENTS

| | | | | |
|---|---|---|---|---|
| JP | 6-306673 A | | 11/1994 | |
| JP | 06306673 A | * | 11/1994 | ........... H01L 29/045 |
| JP | 7-90529 A | | 4/1995 | |
| JP | 11-323594 A | | 11/1999 | |
| JP | 2007-239012 A | | 9/2007 | |
| JP | 2007239012 A | * | 9/2007 | |
| TW | 201332673 A1 | | 8/2013 | |

OTHER PUBLICATIONS

Office Action issued in TW Application No. 107140404 dated Mar. 14, 2019.
Written Opinion of the International Searching Authority for PCT/JP2018/042026 (PCT/ISA/237) dated Jan. 15, 2019.

* cited by examiner

MANUFACTURING METHOD OF GALVANNEALED STEEL SHEET

TECHNICAL FIELD OF THE INVENTION

The present invention relates to a manufacturing method of a galvannealed steel sheet.

RELATED ART

In recent years, it has been required to reduce the amount of carbon dioxide emissions on a global mass scale. Particularly, in the field of vehicles consuming a large amount of fossil fuel, it has been required to reduce the weight of a vehicle body in order to reduce the amount of exhaust gas and improve fuel efficiency. Meanwhile, it has been required to improve the safety of vehicles in the field of vehicles.

In order to satisfy these demands, there is an increasing demand for lightweight and high-strength steel sheets that achieve both weight reduction of the vehicle body and improvement of safety in the field of vehicles.

For example, in structural members such as cross members and side members of vehicles, a high tensile strength steel sheet capable of securing a strength even with a reduced thickness is increasingly used. As such a high tensile strength steel sheet, for example, a steel sheet that has improved strength and ductility by increasing the amount of Si or P, that are inexpensive elements, or combination thereof has attracted attention.

In a vehicle body of a vehicle, a galvannealed steel sheet is used in many cases to improve corrosion resistance and external appearance. However, since Si is an easily oxidizable element as compared with Fe, it is likely to be concentrated on a surface of the steel sheet during annealing. Therefore, in a case where plating is performed on a high tensile strength steel sheet having a high Si content, plating adhesion may be reduced, or plating peeling may occur during post-processing such as press forming due to the concentrated Si.

Moreover, Si and P act to delay alloying of the zinc plating with the steel sheet by participating in the diffusion of Fe and the Fe—Zn reaction in galvannealed steel sheet manufacturing. Therefore, in a galvannealed steel sheet having a high tensile strength steel sheet having a high Si content as a base metal, the production efficiency has been reduced due to a reduction in the alloying rate.

Therefore, various methods for promoting reactivity between the zinc plating and the steel sheet in the galvannealed steel sheet have been studied.

For example, Patent Document 1 discloses a technology for applying a residual stress to a surface of a Si-containing steel sheet, and improving reactivity between the zinc plating and the steel sheet by cold rolling the Si-containing steel sheet using work rolls provided with polishing lines in a roll axis direction.

However, in the technology disclosed in Patent Document 1 described above, since the cold rolling is performed with rolls in which a surface on which the steel sheet is rolled has unevenness, it is difficult to increase the rolling reduction in the cold rolling. Therefore, the technology disclosed in Patent Document 1 has a problem in that a sufficient residual stress cannot be applied to the surface of the steel sheet, and the alloying rate of the steel sheet with the zinc plating cannot be sufficiently improved.

P also has the same characteristics as Si. That is, the strength and ductility can be improved by increasing the P content. However, P is also likely to be concentrated on the surface of the steel sheet during annealing. Therefore, in a case where plating is performed on a high tensile strength steel sheet having a high P content, plating adhesion may be reduced, or plating peeling may occur during post-processing such as press forming due to the concentrated P.

Accordingly, improving the alloying rate of a galvannealed steel sheet by refining the crystal grains of the surface of the steel sheet and by providing, in the surface of the steel sheet, a large number of grain boundaries at which atoms are easily diffused has been considered. According to this, since the diffusion of Fe in the steel sheet and Zn in the coating layer is promoted through the grain boundaries during the alloying treatment, the alloying rate of the galvannealed steel sheet 1 can be improved.

In order to refine the crystal grains of the surface of the steel sheet, it is important to apply a plastic strain to the surface of the steel sheet to introduce lattice defects such as dislocation to the crystal structure. For example, in a case where a huge strain of about equivalent plastic strain 7 is applied to the steel sheet, a mechanism called "grain subdivision" acts to receive the applied strain in the crystal structure of the steel sheet, and thus the crystal grains are divided, and fine nano-level crystal grains are formed.

In order to apply such a huge plastic strain to the steel sheet, for example, uniformly grinding the surface of the steel sheet after hot rolling and pickling (that is, before cold rolling) with a roll brush or the like has been considered. However, by such grinding, unevenness having a sufficient depth cannot be formed on the surface of the steel sheet. For this reason, by the above-described grinding with a roll brush or the like, it is difficult to apply a sufficient strain for forming fine crystal grains to the surface of the steel sheet after cold rolling.

PRIOR ART DOCUMENT

Patent Document

[Patent Document 1] Japanese Unexamined Patent Application, First Publication No. H7-90529

DISCLOSURE OF THE INVENTION

Problems to be Solved by the Invention

Accordingly, the invention has been contrived in view of the above problems, and an object of the invention is to provide a novel and improved manufacturing method of a galvannealed steel sheet, that is capable of improving an alloying rate of the steel sheet with the zinc plating.

Means for Solving the Problem

In order to solve the problems, according to an aspect of the invention, there is provided a manufacturing method of a galvannealed steel sheet, including: forming on a surface of a steel sheet after hot rolling and pickling which contains, by mass %, C: 0.001% to 0.350%, Si: 0.001% to 2.500% or P: 0.001% to 0.100%, or combination thereof, Mn: 0.10% to 3.00%, S: 0.001% to 0.010%, N: 0.0010% to 0.0065%, and sol. Al: 0.001% to 0.800% with a remainder being Fe and impurities, grooves having an opening surface width of 10 μm to 25 μm and a depth of 10 μm to 30 μm at intervals of 20 μm to 500 μm; cold rolling the steel sheet at a rolling reduction of 30% or more; reduction annealing the steel sheet after the cold rolling; immersing the steel sheet in a hot-dip galvanizing bath containing 0.10 mass % to 0.20 mass % of Al with a remainder consisting of Zn and optional components, and adhering a hot-dip galvanized layer to the surface of the steel sheet; and heating the steel sheet to which the hot-dip galvanized layer is adhered, and alloying the steel sheet with the hot-dip galvanized layer.

The steel sheet may contain, by mass %, one or more of Cr: 0.01% to 0.50%, Ti: 0.01% to 0.10%, V: 0.01% to 0.10%, Nb: 0.01% to 0.10%, Ni: 0.01% to 1.00%, Cu: 0.01% to 1.00%, Mo: 0.01% to 1.00%, and B: 0.0003% to 0.0050%.

A forming pattern of the grooves may be a linear pattern extending in a sheet travelling direction or a sheet width direction of the steel sheet.

The grooves may be formed by irradiating the surface of the steel sheet with a laser.

The grooves may be formed by rolling the steel sheet with a roll in which projections corresponding to the grooves are formed on an outer circumferential surface.

Effects of the Invention

As described above, according to the invention, since a huge strain can be locally accumulated on the surface of the steel sheet after cold rolling, the crystal grains in a region where the strain is accumulated can be formed as ultrafine crystal grains with a high alloying rate.

EMBODIMENTS OF THE INVENTION

Hereinafter, preferable embodiments of the invention will be described in detail with reference to the accompanying drawings. In the specification and drawings, constituent elements having substantially the same functional configuration will be denoted by the same reference symbols, and repetitive description will be omitted.

<1. Summary of the Invention>

Figure 1:
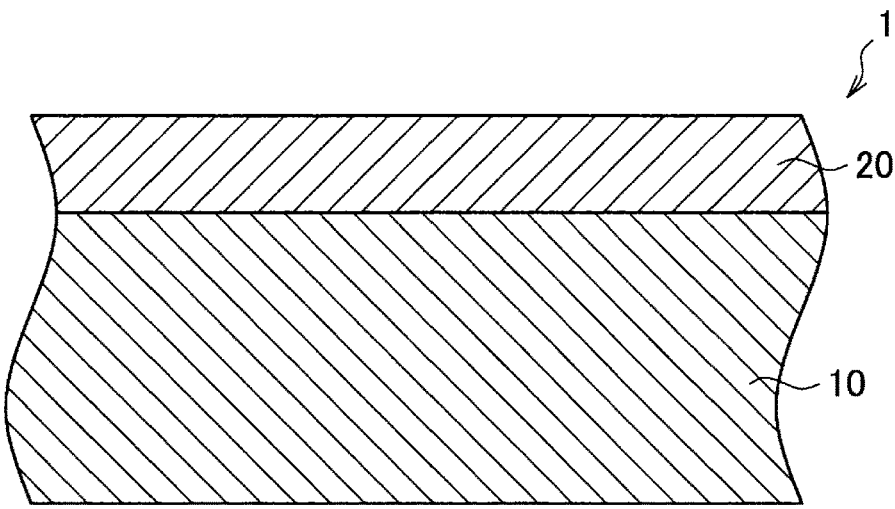
FIG. 1 is a schematic diagram showing a part of a cross section of a galvannealed steel sheet manufactured by a manufacturing method according to an embodiment of the present disclosure, cut in a thickness direction.

First, an outline of a manufacturing method of a galvannealed steel sheet according to an embodiment of the invention will be described. FIG. 1 is a schematic diagram showing a part of a cross section of a galvannealed steel sheet manufactured by the method according to this embodiment, cut in a thickness direction.

In the manufacturing method of a galvannealed steel sheet 1 according to this embodiment, grooves having an opening surface width of 10 µm to 25 µm and a depth of 10 µm to 30 µm are formed at intervals of 20 µm to 500 µm on a surface of the steel sheet 10 after hot rolling and pickling.

In the steel sheet 10 in which unevenness having such large undulations is formed on the surface with a high density, the steel flows greatly to flatten the unevenness in cold rolling. Accordingly, a huge strain is accumulated in the flowing steel. Therefore, since a huge strain can be locally applied to the surface of the steel sheet 10 by cold rolling itself, crystal grains of the steel sheet 10 in a region where the strain is accumulated can be divided and further refined. Accordingly, according to the manufacturing method of a galvannealed steel sheet 1 according to this embodiment, more grain boundaries that promote interdiffusion of Fe and Zn can be formed by refining the crystal grains. Furthermore, the respective crystal grains have a random orientation. For this reason, the alloying rate of the steel sheet 10 with a coating layer 20 can be improved.

Hereinafter, the configuration and the manufacturing method of the galvannealed steel sheet 1 according to this embodiment, of which the outline has been described as above, will be described in detail.

<2. Groove Surface Processing>

Here, a case where grooves are formed on a surface 10a of the steel sheet 10 will be described in detail with reference to FIGS. 2 to 6.

Figure 2A:
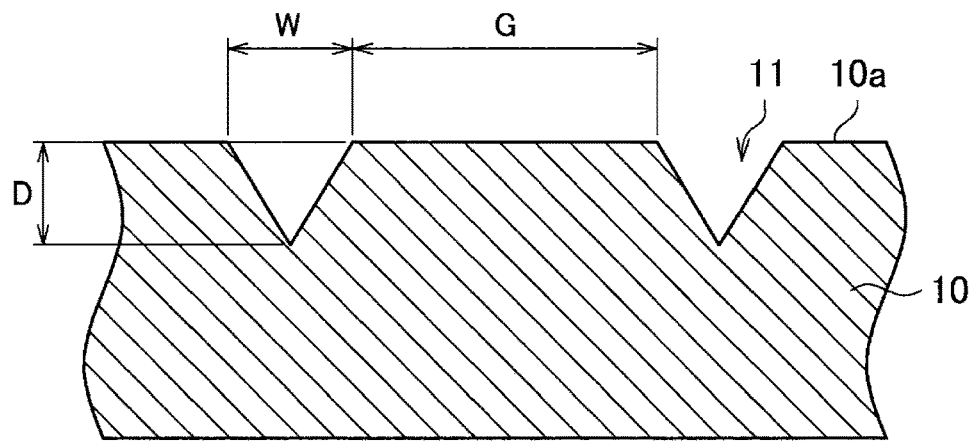
FIG. 2A is a cross-sectional view schematically showing grooves formed on a surface of the steel sheet in a surface processing.
Figure 2B:
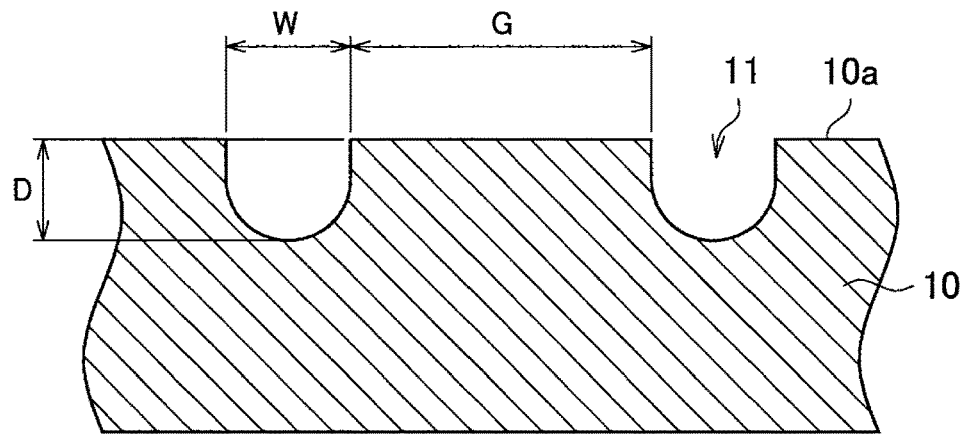
FIG. 2B is a cross-sectional view schematically showing grooves formed on a surface of the steel sheet in the surface processing.
Figure 2C:
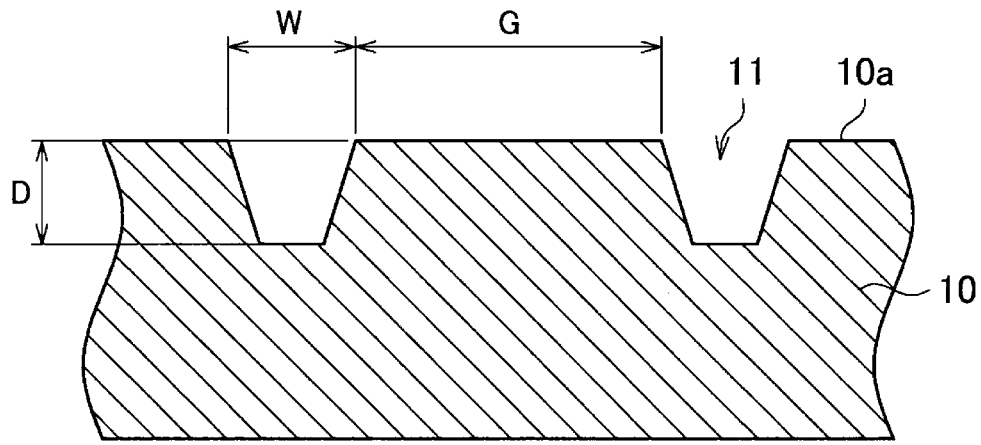
FIG. 2C is a cross-sectional view schematically showing grooves formed on a surface of the steel sheet in the surface processing.

FIGS. 2A to 2C are cross-sectional views schematically showing grooves formed on the surface of the steel sheet 10 in surface processing. The cross-sectional views of FIGS. 2A to 2C show a surface cut along cutting-plane line a-a' of FIG. 7.

As shown in FIG. 2A, grooves 11 having a depth D and an opening surface width W are formed at predetermined intervals G on the surface of the steel sheet 10. The cross-sectional shape of a bottom portion of the groove 11 may be a curved shape as shown in FIG. 2B or a polygonal shape having one or more vertices as shown in FIG. 2C.

The depth D of the groove 11 corresponds to, for example, a distance in a thickness direction of the steel sheet 10 between a bottom surface of the groove 11 and the surface of the steel sheet 10. Here, the depth D of the groove 11 is measured by, for example, a commercially available microscope having a dimension measuring function. For example, measurement may be performed at a magnification of 40 times at four equally divided positions in a width direction of the steel sheet using a microscope VR-3000 manufactured by KEYENCE CORPORATION, and an average value of the groove depths may be defined as the depth D.

The interval G between adjacent opening surfaces of the grooves 11 is a distance between end portions of opening portions of the adjacent grooves 11. Here, the interval G between the grooves 11 is measured by, for example, a commercially available microscope having a dimension measuring function. For example, intervals G may be measured at a magnification of 40 times at each arbitrary positions in a length direction of the groove 11 of the steel sheet using a microscope VR-3000 manufactured by KEYENCE CORPORATION, and an average value thereof may be defined as the interval G.

The width W of the groove 11 corresponds to an opening width of the groove 11. That is, the width W of the groove 11 is a length of the opening surface in the width direction. Here, the width direction is a plane direction (a direction parallel to the surface of the steel sheet 10) vertical to the extending direction (length direction) of the groove 11. In a case where the length of the groove 11 in the plane direction is substantially the same (that is, a case where the extending direction cannot be defined, such as a case where the opening surface of the groove 11 has an annular shape), an arbitrary plane direction may be defined as the width direction. The width W of the groove 11 is measured by, for example, a commercially available microscope having a dimension measuring function. For example, widths W may be measured at a magnification of 40 times at arbitrary positions in the length direction of the steel sheet using a microscope VR-3000 manufactured by KEYENCE CORPORATION, and an average value thereof may be defined as the width W.

In surface processing, grooves having an opening surface width of 10 µm to 25 µm and a depth of 10 µm to 30 µm are formed on the surface of the steel sheet 10 after hot rolling and pickling at intervals of 20 µm to 500 µm with a higher density than in a manufacturing method in which a surface of a steel sheet is uniformly ground with a roll brush or the like as in the related art. Accordingly, the flowing of steel on the surface of the steel sheet 10 is promoted in subsequent cold rolling, and a huge strain (plastic strain) is applied to the surface of the steel sheet 10. According to this, it is possible to divide and refine the crystal grains in a region where the huge strain is applied, and to form more grain boundaries that promote interdiffusion of Fe and Zn. Furthermore, according to the manufacturing method of this embodiment, by providing the above-described grooves before cold rolling, a greater strain can be applied to the grooved region after cold rolling than in a manufacturing method of the related art. Therefore, in a manufacturing method of the related art, the crystal grains in a ground region in the surface of the steel sheet have a [001] plane, whereas the respective crystal grains in the grooved region in this embodiment have a random orientation. For this reason, the alloying rate of the steel sheet 10 with a coating layer 20 can be improved.

Figure 3:
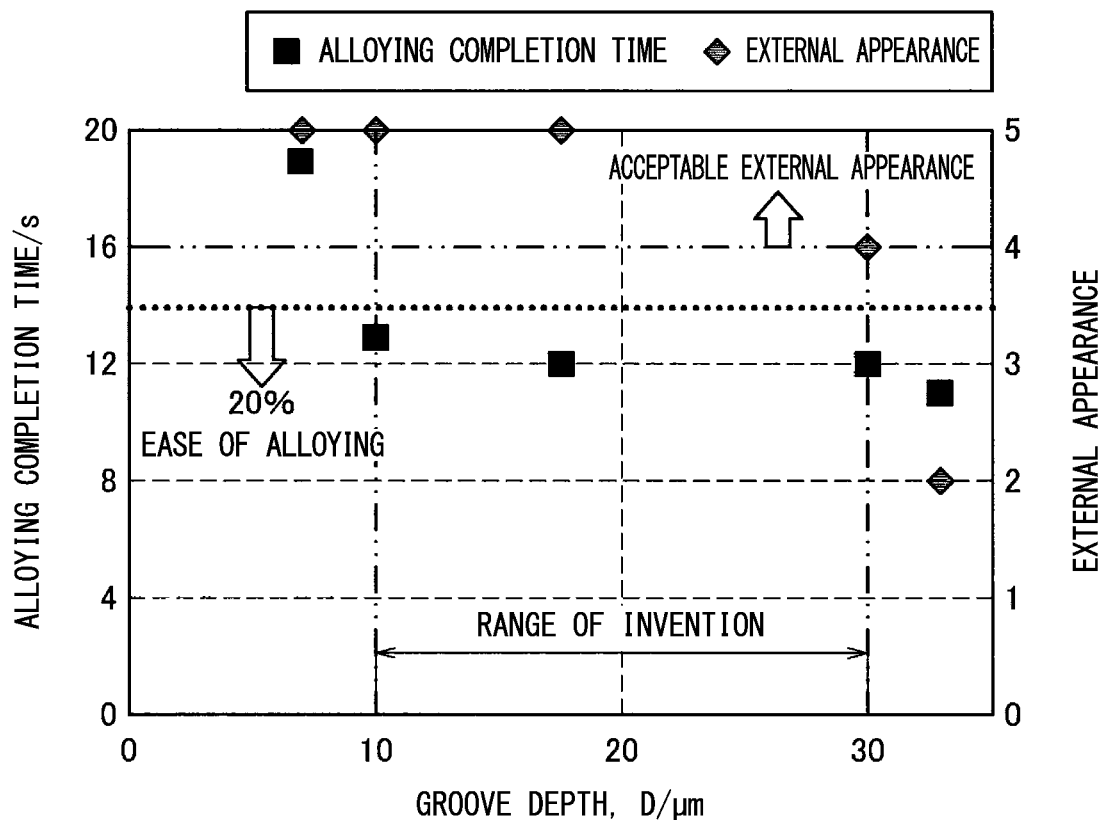
FIG. 3 is a graph showing a relationship between a depth of the grooves formed on the surface of the steel sheet and a period of time required to complete alloying.

FIG. 3 shows a relationship between the depth of the grooves formed on the surface of the steel sheet 10 after hot rolling and pickling, the alloying completion time, and the external appearance. Since the alloying time varies depending on the composition of the steel sheet 10, a steel type A in Table 1A to be described later is used here. The alloying completion time is defined as a period of time until the Fe concentration in the coating layer reaches 4 g/m$^2$ after the alloying treatment at 520° C. The ratio of reduction in alloying completion time between a steel sheet subjected to the surface processing and a steel sheet having the same components as the above steel sheet and subjected to no unevenness surface processing is defined as a rate of alloying time reduction, and a case where the rate of alloying time reduction is at most 20% is regarded to be acceptable. The external appearance is graded on a five-point scale: 5 points: no stripe pattern exists; 4 points: a stripe pattern extremely rarely exists, and there is no problem in external appearance; 3 points: a clear stripe pattern exists, and there is a problem in external appearance; 2 points: a clear stripe pattern frequently exists; and 1 point: a stripe pattern exists on almost the entire surface, and the 4- or higher-point external appearance is regarded to be acceptable. In a case where the depth is less than 10 µm, the external appearance is good, but the alloying time is not sufficiently reduced. This is presumably because a sufficient strain cannot be applied to the surface of the steel sheet 10 after cold rolling. In a case where the depth is 10 µm to 30 µm, the external appearance is acceptable, and the rate of alloying time reduction is also acceptable. In a case where the depth is more than 30 µm, the rate of alloying time reduction is acceptable, but the external appearance is unacceptable. The reason for this is thought to be that the load of cold rolling increases, and the grooves formed on the surface of the steel sheet 10 cannot be sufficiently flattened. Accordingly, in this embodiment, the depth of the groove formed on the surface of the steel sheet 10 is 10 µm to 30 µm, and preferably 15 µm to 25 µm.

Figure 4:
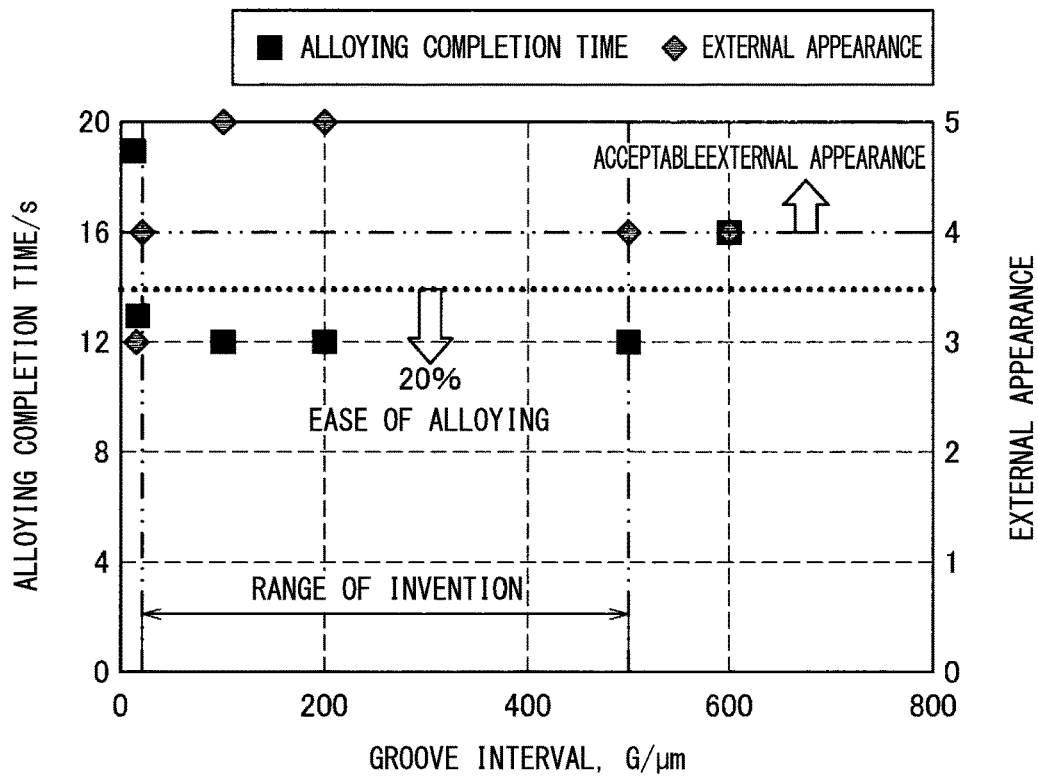
FIG. 4 is a graph showing a relationship between an interval between the grooves formed on the surface of the steel sheet and a period of time required to complete alloying.

FIG. 4 shows a relationship between the interval between the grooves formed on the surface of the steel sheet 10 of the steel type A of FIG. 1A to be described later after hot rolling and pickling, the alloying completion time, and the external appearance. In a case where the interval G between the grooves is less than 20 µm, both the external appearance and the rate of alloying time reduction are unacceptable. This is presumably because the grooves formed on the surface of the steel sheet 10 cannot be sufficiently flattened by cold rolling, and a sufficient strain is not formed on the surface of the steel sheet 10. In a case where the interval G between the grooves is 20 µm to 500 µm, both the external appearance and the rate of alloying time reduction are acceptable. In a case where the interval G between the grooves is more than 500 µm, the external appearance is acceptable, but the rate of alloying time reduction is not sufficient. The reason for this is thought to be that the area ratio of the grooves occupying the surface of the steel sheet 10 is small, and the region where the strain is accumulated after cold rolling is reduced. Accordingly, in this embodiment, the lower limit value of the interval between the grooves formed on the surface of the steel sheet 10 is 20µm or more, preferably 50 µm or more, and more preferably 100 mm or more. The upper limit value of the interval between the grooves is 500 µm or less, preferably 300 µm or less, and more preferably 200 µm or less.

Figure 5:
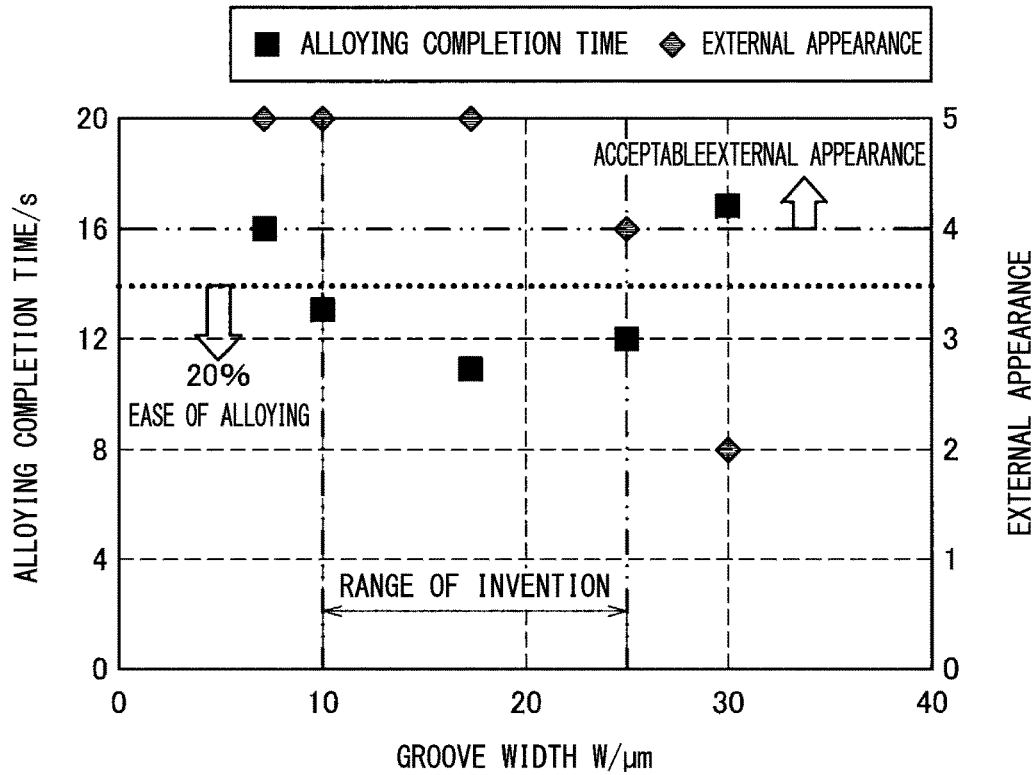
FIG. 5 is a graph showing a relationship between a width of the grooves formed on the surface of the steel sheet and a period of time required to complete alloying.

FIG. 5 shows a relationship between the opening surface width W (hereinafter, also simply referred to as "width") of the grooves formed on the surface of the steel sheet 10 of the steel type A of FIG. 1A to be described later after hot rolling and pickling, the alloying completion time, and the external appearance. In a case where the width W of the groove is less than 10 µm, the external appearance is acceptable, but the rate of alloying time reduction is not sufficient. This is presumably because due to insufficient flowing of the steel during subsequent cold rolling, a sufficient strain cannot be applied to the surface of the steel sheet 10 after cold rolling. In a case where the width W of the groove is 10 µm to 25 µm, both the external appearance and the rate of alloying time reduction are acceptable. In a case where the width W of the groove is more than 25 µm, the rate of alloying time reduction and the external appearance are unacceptable. This is because the grooves cannot be sufficiently flattened by cold rolling, the accumulated strain is small, and the flatness and uniformity of the surface of the galvannealed steel sheet 1 are also reduced. Accordingly, in this embodiment, the width W of the groove formed on the surface of the steel sheet 10 after hot rolling and pickling is 10 µm to 25 µm. The lower limit value is preferably 10 µm or more, and the upper limit value is preferably 20 µm or less.

FIGS. 6 to 10 are plan views schematically showing an example of a planar pattern of grooves 11 formed on the surface of the steel sheet 10 in surface processing. In FIGS. 6 to 10, the X-direction is a sheet travelling direction of the steel sheet 10, and the Y-direction is a sheet width direction of the steel sheet 10.

Figure 6:
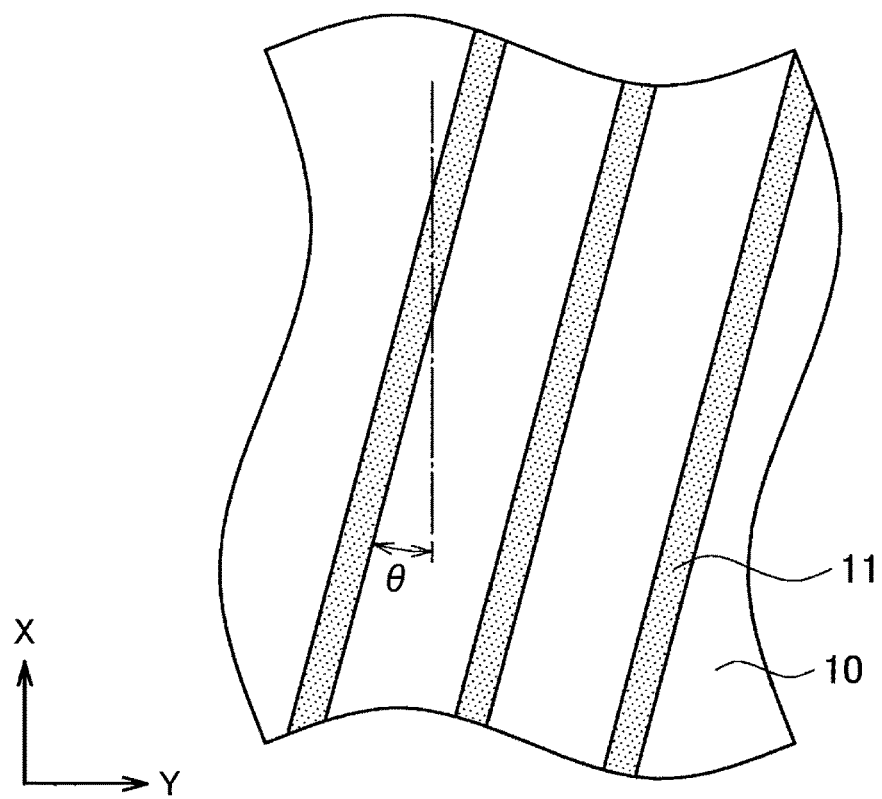
FIG. 6 is a plan view schematically showing an example of a planar pattern of the grooves formed on the surface of the steel sheet in surface processing.

As shown in FIG. 6, the planar pattern of the grooves 11 formed on the surface of the steel sheet 10 may be a linear pattern extending in a direction inclined at an angle θ with respect to the rolling direction of the steel sheet 10. The grooves 11 can be easily formed by, for example, rolling the steel sheet 10 with a roll having a spiral convex shape. In order to avoid meandering of the steel sheet 10 in the continuous hot-dip galvanizing line, a linear pattern extending in the sheet travelling direction or the sheet width direction of the steel sheet may be adopted.

Figure 7:
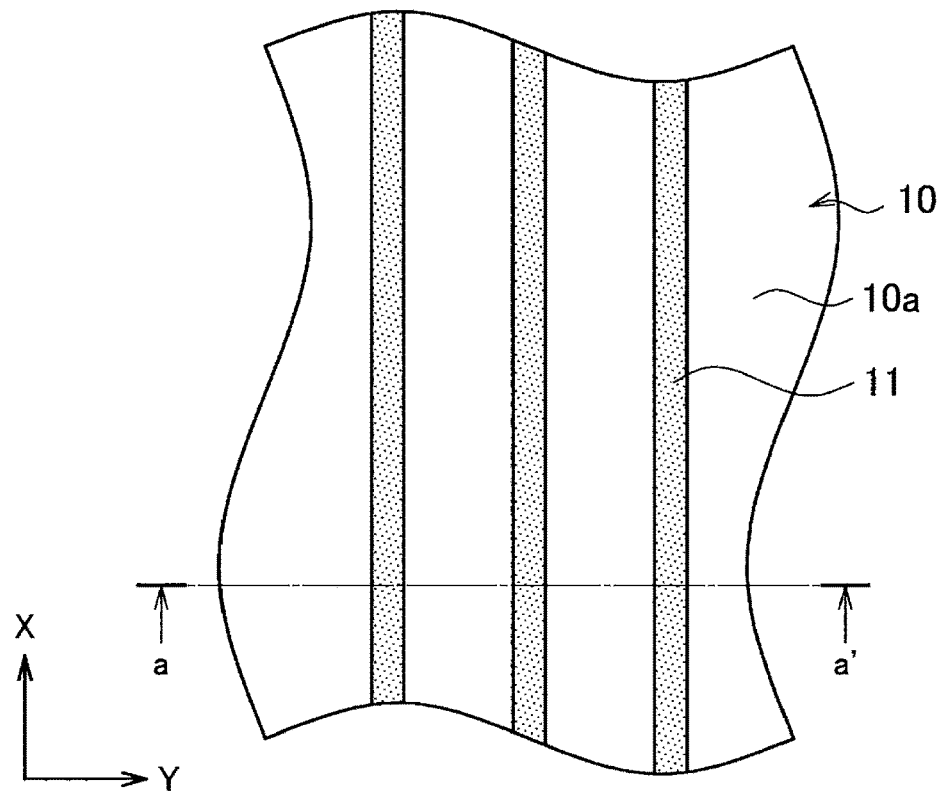
FIG. 7 is a plan view schematically showing another example of the planar pattern of the grooves formed on the surface of the steel sheet in surface processing.

As shown in FIG. 7, the planar pattern of the grooves 11 formed on the surface of the steel sheet 10 may be a linear pattern extending in the sheet travelling direction of the steel sheet 10. The grooves 11 can be easily formed by, for example, continuously irradiating a predetermined position in the steel sheet 10 conveyed at a constant speed with a laser.

Figure 8:
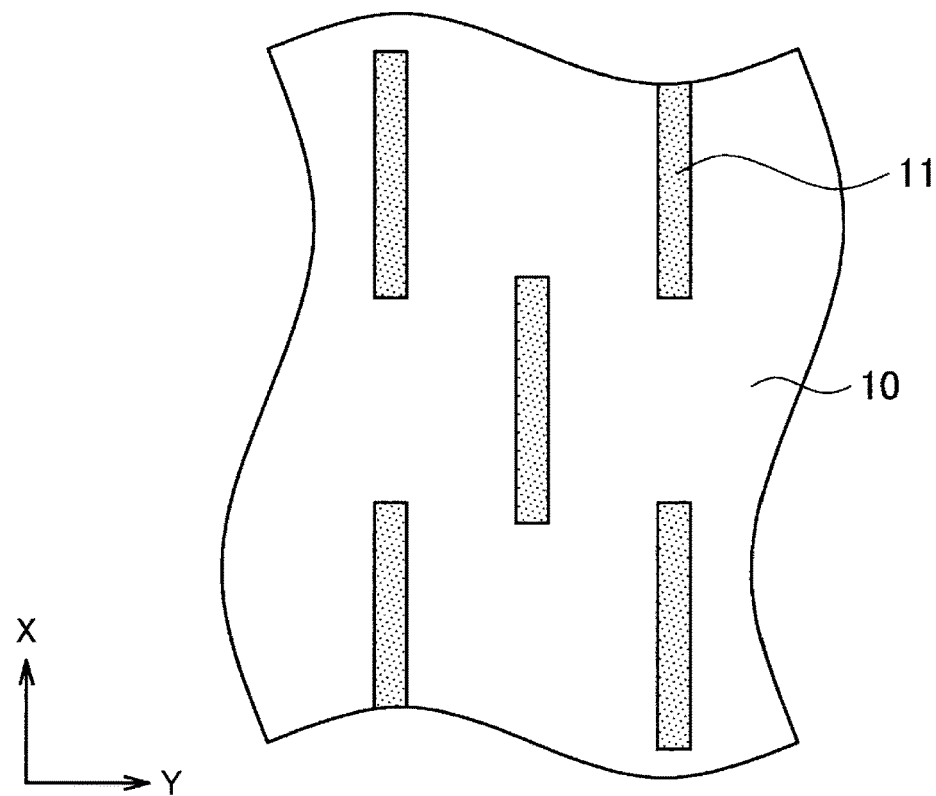
FIG. 8 is a plan view schematically showing a further example of the planar pattern of the grooves formed on the surface of the steel sheet in surface processing.

As shown in FIG. 8, the planar pattern of the grooves 11 formed on the surface of the steel sheet 10 may be a pattern extending in the sheet travelling direction of the steel sheet 10 and divided at every predetermined extending distance. The grooves 11 can be easily formed by, for example, intermittently irradiating a predetermined position in the steel sheet 10 conveyed at a constant speed with a laser.

Figure 9:
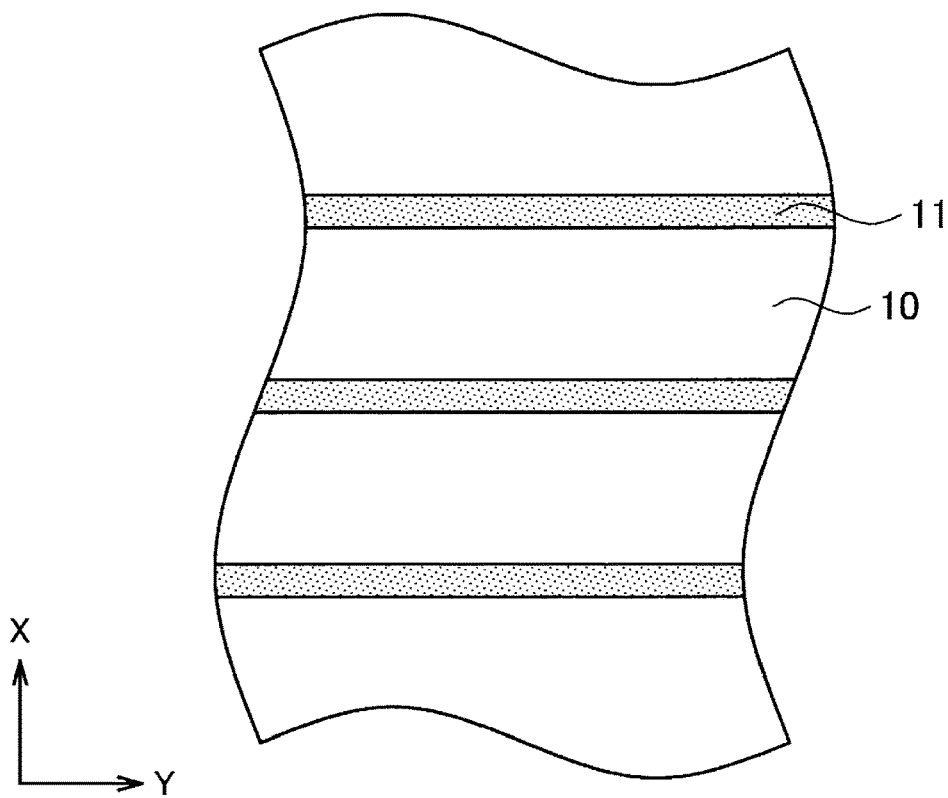
FIG. 9 is a plan view schematically showing a still further example of the planar pattern of the grooves formed on the surface of the steel sheet in surface processing.

As shown in FIG. 9, the planar pattern of the grooves 11 formed on the surface of the steel sheet 10 may be a linear pattern extending in the sheet width direction of the steel sheet 10. The grooves 11 can be easily formed by, for example, rolling the steel sheet 10 with a roll having a gear shape.

Figure 10:
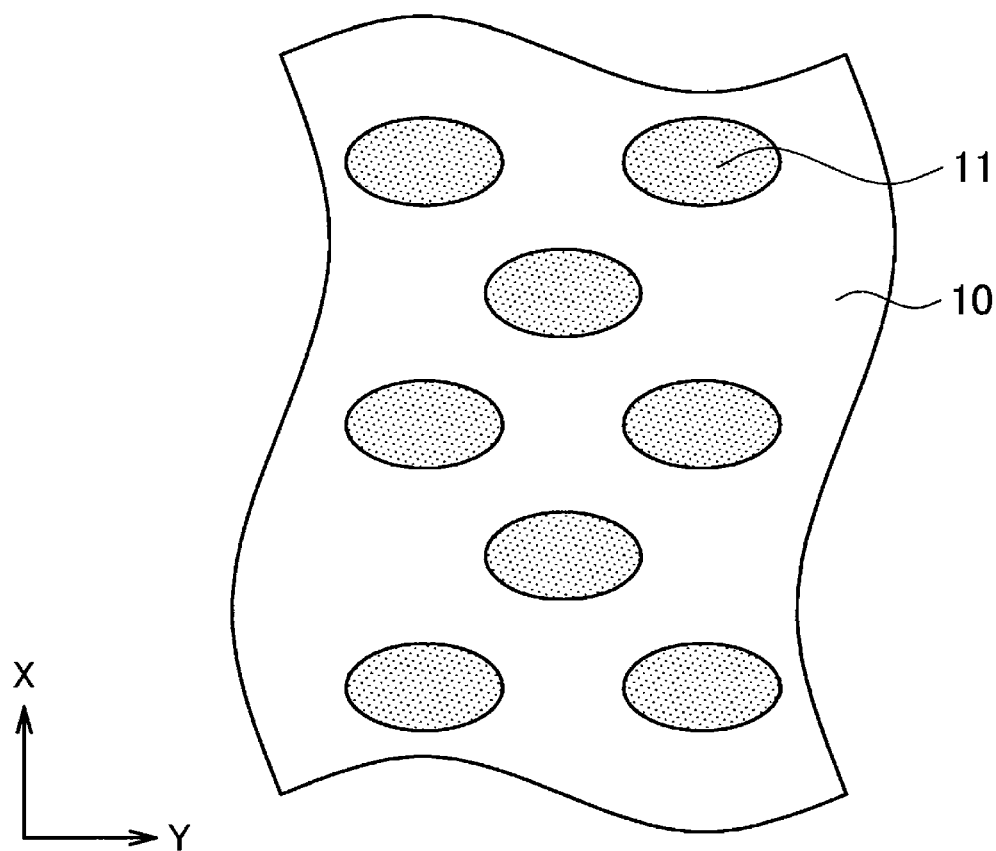
FIG. 10 is a plan view schematically showing a still further example of the planar pattern of the grooves formed on the surface of the steel sheet in surface processing.

As shown in FIG. 10, the planar pattern of the grooves 11 formed on the surface of the steel sheet 10 may be a two-dimensional pattern of circular or elliptical shapes disposed alternately. Regarding the grooves 11, the area in which the grooves 11 are formed is easily increased, and thus it is possible to apply a strain to a wider region in the steel sheet 10.

<3. Composition of Steel Sheet>

First, a composition of the steel sheet 10, that is a base metal of the galvannealed steel sheet 1, will be described. Hereinafter, unless otherwise specified, "%" indicates "mass %", and the ratio of each component of the steel sheet 10 is a ratio based on a total mass of the steel sheet 10. The steel sheet 10 contains, among components to be described below, C, Si or P, or combination thereof, Mn, S, N, and sol. Al with other components as optional components. Preferable amounts of optional components will be described later, and the amount of an optional component may be 0%. The remainder other than the following components that may be contained in the steel sheet 10 consists of iron (Fe) and impurities.

(C: 0.001% to 0.350%)

C (carbon) is an element inevitably contained in steel. In an extra-low carbon steel sheet containing Ti (titanium) and Nb (niobium) added thereto, workability is important. Accordingly, the smaller the C content, the better. However, in a case where the C content is excessively reduced, inclusions in the steel are increased, and thus the elongation of the steel sheet 10 is adversely affected. Therefore, the lower limit of the C content of the steel sheet 10 is 0.001%. In addition, C is an element that contributes to an increase in the strength of the steel sheet 10. For example, in order to control the tensile strength of the steel sheet to 340 MPa or more, the C content is preferably controlled to 0.010% or more. However, in a case where the C content is more than 0.350%, the weldability of the steel sheet 10 deteriorates. Therefore, the upper limit of the C content is 0.350%. Therefore, the C content of the steel sheet 10 is 0.001% to 0.350%. The lower limit value is preferably 0.010% or more, and the upper limit value is preferably 0.250% or less.

(Si: 0.001% to 2.500%)

Si (silicon) is an element that maintains or increases the ductility of the steel sheet 10 and improves the strength of the steel sheet 10. In a case where the Si content is less than 0.001%, it may be difficult to realize a required tensile strength for the steel sheet 10. Therefore, the lower limit of the Si content of the steel sheet 10 is preferably 0.001% or more. In a case where the Si content is more than 2.500%, the alloying rate may not be sufficiently improved even in a case where the invention is applied. Therefore, the upper limit of the Si content of the steel sheet is preferably 2.500% or less. In order to further increase the ductility by a transformation induced plasticity (TRIP) effect, the Si content of the steel sheet 10 is preferably 0.300% or more, and more preferably 0.600% or more. Therefore, the Si content of the steel sheet 10 is 0.001% to 2.500%, preferably 0.300% to 2.500%, and more preferably 0.600% to 2.500%.

(P: 0.001% to 0.100%)

P (phosphorus) is a solid solution strengthening element. Similarly to Si, P is an element that delays alloying of the zinc plating with the steel sheet 10, although being effective for increasing the strength of the steel sheet 10. It is not preferable that the P content of the steel sheet 10 is less than 0.001% since it may be difficult to realize a required tensile strength for the steel sheet 10. It is not preferable that the P content of the steel sheet 10 is more than 0.100% since a sufficient improvement may not be obtained in the alloying rate even in a case where the invention is applied. Therefore, the P content of the steel sheet 10 is preferably 0.001% to 0.100%.

(Mn: 0.10% to 3.00%)

Mn (manganese) is an element that contributes to an increase in the strength of the steel sheet 10. For example, in order to control the tensile strength of the steel sheet 10 to 340 MPa or more, the Mn content of the steel sheet 10 is preferably controlled to 0.10% or more. However, in a case where the Mn content is more than 3.00%, the steel in the converter is difficult to melt and refine, and the weldability of the steel sheet 10 may deteriorate. Therefore, the Mn content of the steel sheet 10 is preferably controlled to 3.00% or less. Therefore, in order to suppress a reduction in the bendability of the steel sheet 10 and to increase the strength of the steel sheet 10, the Mn content of the steel sheet 10 is preferably controlled to 0.10% to 3.0%. In order to control the tensile strength of the steel sheet 10 to 980 MPa or more, the Mn content of the steel sheet 10 is preferably controlled to, for example, 1.80% to 3.00%.

(S: 0.001% to 0.010%)

S (sulfur) is an impurity element contained in steel. From the viewpoint of maintaining the bendability and weldability of the steel sheet 10, the smaller the S content of the steel sheet 10, the more preferable. The S content of the steel sheet 10 is preferably 0.010% or less, more preferably 0.005% or less, and even more preferably 0.003% or less. However, since unnecessary removal of sulfur, that is an impurity, increases the manufacturing cost of the steel sheet 10, the lower limit of the S content of the steel sheet 10 is preferably 0.001% or more.

(N: 0.0010% to 0.0065%)

N (nitrogen) is an impurity element contained in steel. From the viewpoint of maintaining the bendability of the steel sheet 10, the smaller the N content of the steel sheet 10, the more preferable. The N content of the steel sheet 10 is preferably 0.0065% or less, and more preferably 0.0040% or less. However, since unnecessary removal of nitrogen, that is an impurity, increases the manufacturing cost of the steel sheet 10, the lower limit of the N content of the steel sheet 10 is preferably 0.0010% or more.

(sol. Al: 0.001% to 0.800%)

Al (aluminum) is an element added in a steel deoxidation, and is contained as sol. Al (acid-soluble aluminum) in the steel sheet 10. Al is an effective element for improving the yield of elements such as Ti that form a carbonitride. However, in a case where the Si content of the steel sheet 10 is 0.2% or more, Al may not be necessarily contained. This is because in order to sufficiently internally oxidize Si in the steel sheet 10, it is preferable that the amount of sol. Al consuming oxygen is as small as possible. The sol. Al content of the steel sheet 10 is preferably 0.800% or less, more preferably 0.500% or less, and even more preferably less than 0.010%. However, since unnecessary removal of Al, that is added as a deoxidizing material, increases the manufacturing cost of the steel sheet 10, the lower limit of the Al content of the steel sheet 10 is preferably 0.001% or more.

(Other Optional Components)

One or more of Cr (chromium), Ti (titanium), V (vanadium), Nb (niobium), Ni (nickel), Cu (copper), Mo (molybdenum), and B (boron) may be optionally contained in the steel sheet 10. In a case where these elements are contained in the steel sheet 10, for example, characteristics of the steel sheet 10, such as strength, hole expansibility, and elongation, can be improved.

However, in a case where these elements are contained in a predetermined amount, the characteristic improving effect is saturated. Therefore, in a case where these elements are contained in the steel sheet 10 in excess of the predetermined amount, the manufacturing cost of the steel sheet 10 is increased. Therefore, preferably, the Cr content may be 0.50% or less, the Ti content may be 0.10% or less, the V content may be 0.10% or less, the Nb content may be 0.10% or less, the Ni content may be 1.00% or less, the Cu content may be 1.00% or less, the Mo content may be 1.00% or less, and the B content may be 0.0050% or less. In order to securely obtain the effect of improving the characteristics of the steel sheet 10 described above, such as strength, hole expansibility, and elongation, preferably, the Cr content may be 0.01% or more, the Ti content may be 0.01% or more, the V content may be 0.01% or more, the Nb content may be 0.01% or more, the Ni content may be 0.01% or more, the Cu content may be 0.01% or more, the Mo content may be 0.01% or more, and the B content may be 0.0003% or more.

<4. Manufacturing Method>

Next, a manufacturing method of the galvannealed steel sheet according to this embodiment will be described in detail.

First, a steel slab having the above-described composition is prepared, and the prepared steel slab is made into a steel sheet 10 by hot rolling. Next, the hot rolled steel sheet 10 is pickled. The steel sheet 10 after hot rolling and pickling, from which oxides and the like have been removed, is subjected to the following in sequence, and thus a galvannealed steel sheet 1 according to this embodiment can be manufactured. As conditions of hot rolling and pickling, known general conditions can be employed. Accordingly, a description thereof will be omitted here.

Surface Processing: forming grooves on the surface of the steel sheet 10

Cold Rolling: cold rolling the steel sheet 10 having the grooves formed thereon Annealing: annealing the cold rolled steel sheet 10

Plating: immersing the annealed steel sheet 10 in a hot-dip galvanizing bath to form a coating layer 20 on the surface of the steel sheet 10

Alloying: heating the steel sheet 10 on which the coating layer 20 is formed, and alloying the steel sheet 10 with the coating layer 20

(Surface Processing)

Since surface processing has been described above, a description thereof will be omitted.

(Cold Rolling)

In cold rolling, the steel sheet 10 in which grooves are formed on the surface by surface processing is cold rolled. Specifically, the steel sheet 10 having grooves formed thereon is rolled at a temperature lower than that of hot rolling to further reduce the thickness of the steel sheet 10. Accordingly, since the grooves formed on the surface of the steel sheet 10 are flattened by rolling and a huge strain is locally applied to the steel flowing for the flattening of the steel sheet 10, the crystal grains of the steel sheet 10 in a region where the strain is applied are divided and further refined.

In this embodiment, the rolling reduction of the steel sheet 10 in cold rolling is 30% or more. It is not preferable that the rolling reduction of the steel sheet 10 in the cold rolling is less than 30% since the grooves formed on the surface of the steel sheet 10 cannot be sufficiently flattened by cold rolling, and the flatness and uniformity of the surface of the galvannealed steel sheet 1 are reduced. In order to improve the flatness and uniformity of the surface of the galvannealed steel sheet 1, the rolling reduction of the steel sheet 10 in the cold rolling is preferably 50% or more.

(Annealing)

In annealing, the cold rolled steel sheet 10 is annealed in a reducing atmosphere. The atmosphere during annealing may be, for example, a nitrogen-hydrogen mixed reducing atmosphere having a hydrogen concentration of 3 volume % to 12 volume % and a dew point of $-40°$ C. to $20°$ C. Since an increase in the dew point can be mitigated by lowering the hydrogen concentration in the atmosphere during annealing, the hydrogen concentration in the atmosphere is preferably controlled to 3 volume % to 12 volume %, and more preferably 8 volume % or less. The lower limit value of the dew point of the atmosphere during annealing is preferably $-30°$ C. or higher, and more preferably $-20°$ C. or higher. The upper limit of the dew point is preferably $10°$ C. or lower. The atmosphere during annealing may further contain a minute amount of $H_2O$, $CO_2$, $CO$, $CH_4$, and the like as an impurity gas.

The temperature during annealing may be a general temperature in annealing. For example, the temperature may be $700°$ C. to $850°$ C. The retention time at the temperature during annealing may be a general period of time in annealing. For example, the retention time may be 30 seconds to 150 seconds. Through annealing, in a region in the surface of the steel sheet 10 in which a huge strain is applied, the crystal grains are refined, and many grain boundaries at which the atom diffusion rate is high are formed. According to this, diffusion of Fe and Zn at the interface between the steel sheet 10 and the coating layer 20 is promoted in subsequent alloying, whereby the alloying rate of the galvannealed steel sheet 1 can be improved.

(Plating)

In plating, the steel sheet 10 after reduction annealing is immersed in a hot-dip galvanizing bath containing at least 0.10% to 0.20% of Al with respect to a total mass of the plating bath with a remainder consisting of Zn to form a coating layer 20 on the surface (for example, both main surfaces) of the steel sheet 10.

However, in a case where the Al concentration in the coating bath is less than 0.10%, the alloying of the steel sheet 10 with the coating layer 20 progresses during immersing of the steel sheet 10 in the coating bath, and thus it may be difficult to control a coating adhesion amount. In a case where the Al concentration in the coating bath is less than 0.10%, bottom dross (for example, $FeZn_7$) is likely to be formed in a bottom portion of a pot retaining the coating bath. In such a case, since the formed dross adheres to the steel sheet 10, defects are likely to occur in the coating layer 20, and thus the yield of the galvannealed steel sheet 1 is greatly reduced. Therefore, the Al concentration in the coating bath is 0.10% or more, and preferably 0.15% or more. In a case where the Al concentration in the coating bath is more than 0.20%, the alloying rate of the steel sheet 10 with the coating layer 20 is significantly reduced, and thus the operation efficiency of plating is lowered. Accordingly, the Al concentration in the coating bath is 0.20% or less.

The coating bath may contain, in addition to the above-described Al, Fe as an impurity and an optional component Pb, Cd, Sb, Cr, Ni, W, Ti, Mg, or Si in an amount of 0.1% or less, respectively. Each of the components does not affect the effects of the invention.

The bath temperature of the coating bath may be, for example, 440° C. to 470° C. From the viewpoint of stabilizing the temperature of the coating bath, the steel sheet 10 to be immersed in the coating bath may be heated to a temperature of (bath temperature±20° C.).

(Alloying)

In alloying, the steel sheet 10 on which the coating layer 20 is formed is heated at a temperature of, for example, 450° C. to 600° C., and thus alloying of the steel sheet 10 with the coating layer 20 progresses. However, in a case where alloying of the steel sheet 10 with the coating layer 20 progresses at a high temperature, a $\Gamma$ phase and a $\Gamma_1$ phase as a FeZn alloy having high hardness are likely to be formed, and thus powdering resistance may be reduced. Therefore, the heating temperature of the steel sheet 10 is preferably 600° C. or lower, more preferably 550° C. or lower, and even more preferably 530° C. or lower. The lower limit of the heating temperature of the steel sheet 10 is not particularly limited, and may be, for example, 450° C. In alloying, a method for heating the steel sheet 10 is not particularly limited, and any of radiation heating, high-frequency induction heating, and energization heating can be used. The coating layer 20 contains Fe diffused from the steel sheet 10, and the average Fe concentration in the coating layer 20 is preferably 8% to 15%.

The average concentration of each component in the coating layer 20 described above is a ratio of each component to a total mass of the coating layer 20. The average concentration of each component can be calculated by, for example, analyzing a solution obtained by dissolving the coating layer 20 with an acid or the like using inductively coupled plasma-atomic emission spectrometry (ICP-AES) or the like.

The adhesion amount of the coating layer 20 in the galvannealed steel sheet 1 is not particularly limited, and is preferably controlled to 30 $g/m^2$ or more per surface, that can be easily adjusted with the existing equipment. In addition, the adhesion amount of the coating layer 20 is preferably controlled to 70 $g/m^2$ or less per surface so as not to greatly reduce powdering resistance. Accordingly, the adhesion amount of the coating layer 20 of the galvannealed steel sheet 1 is preferably 30 $g/m^2$ to 70 $g/m^2$ per surface. The lower limit value of the adhesion amount is preferably 40 $g/m^2$ or more per surface, and the upper limit value of the adhesion amount is preferably 60 $g/m^2$ or less.

The galvannealed steel sheet 1 can be manufactured through the above. In the galvannealed steel sheet 1, since many grain boundaries at which the atom diffusion rate is high are formed in the surface of the steel sheet 10, diffusion of Fe and Zn is promoted, and the alloying rate of the steel sheet 10 with the coating layer 20 can thus be improved.

According to this embodiment, by improving the alloying rate of the steel sheet 10 with the coating layer 20, the productivity of the galvannealed steel sheet 1 can be improved, and the energy consumption in the manufacturing line can be reduced. According to this embodiment, since the unalloyed region can be reduced between the steel sheet 10 and the coating layer 20, the yield of the galvannealed steel sheet 1, and the adhesion between the steel sheet 10 and the coating layer 20 can be improved.

The coating layer 20 of the galvannealed steel sheet 1 may be subjected to known post-processing such as a chromic acid treatment, a phosphate treatment, or resin film coating. A rust preventive oil may be applied to the outermost surface of the galvannealed steel sheet 1 (that is, the surface of the coating layer 20 of the galvannealed steel sheet 1 or the surface of the post-treatment film). As the rust preventive oil applied to the outermost surface of the galvannealed steel sheet 1, a commercially available general rust preventive oil may be used. A high lubricity rust preventive oil containing S or Ca may also be used.

EXAMPLES

Hereinafter, the manufacturing method of the galvannealed steel sheet according to an embodiment of the invention will be described in greater detail with reference to examples and comparative examples. The examples shown below are merely one condition example, and the invention is not limited to the following examples.

First, steels containing components shown in the following Tables 1A and 1B with a remainder consisting of Fe and unavoidable impurities were cast and processed into slabs having a sheet thickness of 30 mm, respectively. Next, the produced slab was retained for 1 hour at 1,250° C. in the air, and then subjected to hot rolling including rough rolling and finish rolling. The finish rolling was performed at 950° C., and the finish thickness of the steel sheet after hot rolling was 2.5 mm. Next, the hot rolled steel sheet was pickled, and then using laser processing, grooves having a pattern shown in the following Tables 2A and 2B were formed on a surface of the steel sheet subjected to hot rolling and pickling. Thereafter, cold rolling was performed so as to obtain a sheet thickness of 1.2 mm. The depth, interval, and width of the grooves were measured by the methods described above.

Next, the cold rolled steel sheet was degreased and washed with a NaOH solution at 75° C., and then subjected to reduction annealing for 60 seconds at 800° C. in a reducing atmosphere of $N_2$+3 volume % to 8 volume % $H_2$ with a dew point of −40° C. After annealing, the steel sheet was cooled at 15° C./s to near the bath temperature (455° C.) of a hot-dip galvanizing bath, and then immersed in the hot-dip galvanizing bath containing 0.135% of Al. After immersing of the steel sheet in the coating bath for 3.0 seconds, the coating adhesion amount was adjusted to 50 g/m² per surface by wiping method.

Next, an alloying treatment was performed on the plated steel sheet using an energization heating device at 520° C., and the alloying time was measured by measuring a standard period of time until the Fe concentration in the coating layer reaches 4 g/m². An air cooling method was used for cooling.

Tables 2A and 2B show the alloying time measurement results of the examples and the comparative examples.

The external appearance of the galvannealed steel sheet was visually evaluated. Specifically, the external appearance is graded on a five-point scale: 5 points: no stripe pattern exists; 4 points: a stripe pattern extremely rarely exists, and there is no problem in external appearance; 3 points: a clear stripe pattern exists, and there is a problem in external appearance; 2 points: a clear stripe pattern frequently exists; and 1 point: a stripe pattern exists on almost the entire surface, and the 4- or higher-point external appearance is regarded to be acceptable.

The following Tables 2A and 2B show the manufacturing conditions and evaluation results of the examples and the comparative examples.

TABLE 1A

| | Steel Type | Components (mass %) | | | | | | | | | | | | | |
|---|---|---|---|---|---|---|---|---|---|---|---|---|---|---|---|
| | | C | Si | P | Mn | S | N | Al | Cr | Ti | V | Nb | Ni | Cu | Mo | B |
| Comparative Example 1 | A | 0.002 | 0.104 | 0.088 | 0.15 | 0.009 | 0.0024 | 0.031 | — | — | — | — | — | — | — | — |
| Comparative Example 2 | A | 0.002 | 0.104 | 0.088 | 0.15 | 0.009 | 0.0024 | 0.031 | — | — | — | — | — | — | — | — |
| Example 1 | A | 0.002 | 0.104 | 0.088 | 0.15 | 0.009 | 0.0024 | 0.031 | — | — | — | — | — | — | — | — |
| Example 2 | A | 0.002 | 0.104 | 0.088 | 0.15 | 0.009 | 0.0024 | 0.031 | — | — | — | — | — | — | — | — |
| Example 3 | A | 0.002 | 0.104 | 0.088 | 0.15 | 0.009 | 0.0024 | 0.031 | — | — | — | — | — | — | — | — |
| Comparative Example 3 | A | 0.002 | 0.104 | 0.088 | 0.15 | 0.009 | 0.0024 | 0.031 | — | — | — | — | — | — | — | — |
| Comparative Example 4 | A | 0.002 | 0.104 | 0.088 | 0.15 | 0.009 | 0.0024 | 0.031 | — | — | — | — | — | — | — | — |
| Example 4 | A | 0.002 | 0.104 | 0.088 | 0.15 | 0.009 | 0.0024 | 0.031 | — | — | — | — | — | — | — | — |
| Example 5 | A | 0.002 | 0.104 | 0.088 | 0.15 | 0.009 | 0.0024 | 0.031 | — | — | — | — | — | — | — | — |
| Example 6 | A | 0.002 | 0.104 | 0.088 | 0.15 | 0.009 | 0.0024 | 0.031 | — | — | — | — | — | — | — | — |
| Example 7 | A | 0.002 | 0.104 | 0.088 | 0.15 | 0.009 | 0.0024 | 0.031 | — | — | — | — | — | — | — | — |
| Comparative Example 5 | A | 0.002 | 0.104 | 0.088 | 0.15 | 0.009 | 0.0024 | 0.031 | — | — | — | — | — | — | — | — |
| Comparative Example 6 | A | 0.002 | 0.104 | 0.088 | 0.15 | 0.009 | 0.0024 | 0.031 | — | — | — | — | — | — | — | — |
| Example 8 | A | 0.002 | 0.104 | 0.088 | 0.15 | 0.009 | 0.0024 | 0.031 | — | — | — | — | — | — | — | — |
| Example 9 | A | 0.002 | 0.104 | 0.088 | 0.15 | 0.009 | 0.0024 | 0.031 | — | — | — | — | — | — | — | — |
| Example 10 | A | 0.002 | 0.104 | 0.088 | 0.15 | 0.009 | 0.0024 | 0.031 | — | — | — | — | — | — | — | — |
| Comparative Example 7 | A | 0.002 | 0.104 | 0.088 | 0.15 | 0.009 | 0.0024 | 0.031 | — | — | — | — | — | — | — | — |

TABLE 1B

| | Steel Type | Components (mass %) | | | | | | | | | | | | | |
|---|---|---|---|---|---|---|---|---|---|---|---|---|---|---|---|
| | | C | Si | P | Mn | S | N | Al | Cr | Ti | V | Nb | Ni | Cu | Mo | B |
| Comparative Example 8 | B | 0.002 | 0.041 | 0.082 | 0.44 | 0.005 | 0.0033 | 0.022 | — | 0.03 | — | — | — | — | — | — |
| Example 11 | B | 0.002 | 0.041 | 0.082 | 0.44 | 0.005 | 0.0033 | 0.022 | — | 0.03 | — | — | — | — | — | — |
| Comparative Example 9 | C | 0.002 | 0.205 | 0.055 | 0.61 | 0.006 | 0.0024 | 0.035 | — | 0.03 | — | 0.05 | — | — | — | — |
| Example 12 | C | 0.002 | 0.205 | 0.055 | 0.61 | 0.006 | 0.0024 | 0.035 | — | 0.03 | — | 0.05 | — | — | — | — |
| Comparative Example 10 | D | 0.002 | 0.211 | 0.054 | 0.61 | 0.005 | 0.0027 | 0.039 | — | 0.03 | — | 0.05 | — | — | — | 0.0003 |
| Example 13 | D | 0.002 | 0.211 | 0.054 | 0.61 | 0.005 | 0.0027 | 0.039 | — | 0.03 | — | 0.05 | — | — | — | 0.0003 |
| Comparative Example 11 | E | 0.002 | 0.205 | 0.055 | 0.61 | 0.006 | 0.0022 | 0.040 | — | — | 0.03 | — | — | — | — | — |
| Example 14 | E | 0.002 | 0.205 | 0.055 | 0.61 | 0.006 | 0.0022 | 0.040 | — | — | 0.03 | — | — | — | — | — |
| Comparative Example 12 | F | 0.002 | 0.198 | 0.056 | 0.61 | 0.006 | 0.0029 | 0.033 | 0.20 | — | — | 0.40 | — | — | — | — |
| Example 15 | F | 0.002 | 0.198 | 0.056 | 0.61 | 0.006 | 0.0029 | 0.033 | 0.20 | — | — | 0.40 | — | — | — | — |
| Comparative Example 13 | G | 0.002 | 0.234 | 0.049 | 0.61 | 0.004 | 0.0030 | 0.036 | — | — | — | — | 0.30 | 0.20 | — | — |
| Example 16 | G | 0.002 | 0.234 | 0.049 | 0.61 | 0.004 | 0.0030 | 0.036 | — | — | — | — | 0.30 | 0.20 | — | — |
| Comparative Example 14 | H | 0.002 | 0.205 | 0.066 | 0.61 | 0.005 | 0.0031 | 0.031 | — | — | — | — | — | — | 0.20 | — |
| Example 17 | H | 0.002 | 0.205 | 0.066 | 0.61 | 0.005 | 0.0031 | 0.031 | — | — | — | — | — | — | 0.20 | — |

TABLE 1B-continued

| | Steel Type | Components (mass %) | | | | | | | | | | | | | | |
|---|---|---|---|---|---|---|---|---|---|---|---|---|---|---|---|---|
| | | C | Si | P | Mn | S | N | Al | Cr | Ti | V | Nb | Ni | Cu | Mo | B |
| Comparative Example 15 | I | 0.002 | 0.204 | 0.054 | 0.61 | 0.007 | 0.0024 | 0.034 | — | — | — | — | 0.30 | — | — | — |
| Example 18 | I | 0.002 | 0.204 | 0.054 | 0.61 | 0.007 | 0.0024 | 0.034 | — | — | — | — | 0.30 | — | — | — |
| Comparative Example 16 | J | 0.002 | 0.204 | 0.060 | 0.61 | 0.006 | 0.0025 | 0.031 | — | 0.05 | — | — | — | 0.40 | — | 0.0008 |
| Example 19 | J | 0.002 | 0.204 | 0.060 | 0.61 | 0.006 | 0.0025 | 0.031 | — | 0.05 | — | — | — | 0.40 | — | 0.0008 |
| Comparative Example 17 | K | 0.180 | 1.090 | 0.031 | 0.97 | 0.005 | 0.0062 | 0.035 | 0.30 | — | — | — | — | — | — | 0.0020 |
| Example 20 | K | 0.180 | 1.090 | 0.031 | 0.97 | 0.005 | 0.0062 | 0.035 | 0.30 | — | — | — | — | — | — | 0.0020 |
| Comparative Example 18 | L | 0.118 | 1.090 | 0.031 | 0.97 | 0.005 | 0.0062 | 0.750 | — | — | — | — | — | — | — | — |
| Example 21 | L | 0.118 | 1.090 | 0.031 | 0.97 | 0.005 | 0.0062 | 0.750 | — | — | — | — | — | — | — | — |
| Comparative Example 19 | M | 0.222 | 1.514 | 0.001 | 2.52 | 0.005 | 0.0035 | 0.035 | — | — | — | — | — | — | 0.20 | — |
| Example 22 | M | 0.222 | 1.514 | 0.001 | 2.52 | 0.005 | 0.0035 | 0.035 | — | — | — | — | — | — | 0.20 | — |
| Comparative Example 20 | N | 0.203 | 2.040 | 0.008 | 2.5 | 0.003 | 0.0026 | 0.036 | 0.12 | 0.05 | — | — | — | — | — | — |
| Example 23 | N | 0.203 | 2.040 | 0.008 | 2.5 | 0.003 | 0.0026 | 0.036 | 0.12 | 0.05 | — | — | — | — | — | — |
| Comparative Example 21 | O | 0.311 | 2.230 | 0.045 | 2.56 | 0.005 | 0.0035 | 0.042 | — | — | 0.05 | — | — | — | — | — |
| Example 24 | O | 0.311 | 2.230 | 0.045 | 2.56 | 0.005 | 0.0035 | 0.042 | — | — | 0.05 | — | — | — | — | — |

TABLE 2A

| | Shape of Grooves | | Opening | Alloying | | | External Appearance | | |
|---|---|---|---|---|---|---|---|---|---|
| | Depth D (μm) | Interval G (μm) | Surface Width W (μm) | Alloying Time (s) | Rate of Alloying Time Reduction (%) | Determination of Alloying | External Appearance Point | Determination of External Appearance | Comprehensive Determination |
| Comparative Example 1 | no grooves | — | — | 17 | — | | 5 | OK | NG |
| Comparative Example 2 | 7 | 500 | 10 | 19 | 0 | NG | 5 | OK | NG |
| Example 1 | 10 | 500 | 10 | 13 | 24 | OK | 5 | OK | OK |
| Example 2 | 18 | 500 | 10 | 12 | 29 | OK | 5 | OK | OK |
| Example 3 | 30 | 500 | 10 | 12 | 29 | OK | 4 | OK | OK |
| Comparative Example 3 | 33 | 500 | 10 | 11 | 35 | OK | 2 | NG | NG |
| Comparative Example 4 | 18 | 17 | 10 | 18 | 0 | NG | 3 | OK | NG |
| Example 4 | 18 | 20 | 10 | 13 | 24 | OK | 4 | OK | OK |
| Example 5 | 18 | 100 | 10 | 12 | 29 | OK | 5 | OK | OK |
| Example 6 | 18 | 200 | 10 | 12 | 29 | OK | 5 | OK | OK |
| Example 7 | 18 | 500 | 10 | 12 | 29 | OK | 4 | OK | OK |
| Comparative Example 5 | 18 | 600 | 10 | 16 | 6 | NG | 4 | OK | NG |
| Comparative Example 6 | 18 | 500 | 7 | 16 | 6 | NG | 5 | OK | NG |
| Example 8 | 18 | 500 | 10 | 13 | 24 | OK | 5 | OK | OK |
| Example 9 | 18 | 500 | 18 | 11 | 35 | OK | 5 | OK | OK |
| Example 10 | 18 | 500 | 25 | 12 | 29 | OK | 4 | OK | OK |
| Comparative Example 7 | 18 | 500 | 30 | 17 | 0 | NG | 2 | NG | NG |

TABLE 2B

| | Shape of Grooves | | | Alloying | | | External Appearance | | |
|---|---|---|---|---|---|---|---|---|---|
| | Depth D (μm) | Interval G (μm) | Opening Surface Width W (μm) | Alloying Time (s) | Rate of Alloying Time Reduction (%) | Determination of Alloying | External Appearance Point | Determination of External Appearance | Comprehensive Determination |
| Comparative Example 8 | no grooves | | | 15 | — | NG | 5 | OK | NG |
| Example 11 | 18 | 200 | 10 | 12 | 20 | OK | 5 | OK | OK |
| Comparative Example 9 | no grooves | | | 17 | — | NG | 5 | OK | NG |
| Example 12 | 18 | 200 | 10 | 11 | 35 | OK | 5 | OK | OK |
| Comparative Example 10 | no grooves | | | 16 | — | NG | 5 | OK | NG |
| Example 13 | 18 | 200 | 10 | 12 | 25 | OK | 5 | OK | OK |
| Comparative Example 11 | no grooves | | | 15 | — | NG | 5 | OK | NG |
| Example 14 | 18 | 200 | 10 | 10 | 33 | OK | 5 | OK | OK |
| Comparative Example 12 | no grooves | | | 16 | — | NG | 5 | OK | NG |
| Example 15 | 18 | 200 | 10 | 11 | 31 | OK | 5 | OK | OK |
| Comparative Example 13 | no grooves | | | 15 | — | NG | 5 | OK | NG |
| Example 16 | 18 | 200 | 10 | 12 | 20 | OK | 5 | OK | OK |
| Comparative Example 14 | no grooves | | | 16 | — | NG | 5 | OK | NG |
| Example 17 | 18 | 200 | 10 | 10 | 38 | OK | 5 | OK | OK |
| Comparative Example 15 | no grooves | | | 15 | — | NG | 5 | OK | NG |
| Example 18 | 18 | 200 | 10 | 11 | 27 | OK | 5 | OK | OK |
| Comparative Example 16 | no grooves | | | 15 | — | NG | 5 | OK | NG |
| Example 19 | 18 | 200 | 10 | 12 | 20 | OK | 5 | OK | OK |
| Comparative Example 17 | no grooves | | | 37 | — | NG | 5 | OK | NG |
| Example 20 | 18 | 200 | 10 | 16 | 57 | OK | 5 | OK | OK |
| Comparative Example 18 | no grooves | | | 43 | — | NG | 5 | OK | NG |
| Example 21 | 18 | 200 | 10 | 14 | 67 | OK | 5 | OK | OK |
| Comparative Example 19 | no grooves | | | 44 | — | NG | 5 | OK | NG |
| Example 22 | 18 | 200 | 10 | 15 | 66 | OK | 5 | OK | OK |
| Comparative Example 20 | no grooves | | | 47 | — | NG | 5 | OK | NG |
| Example 23 | 18 | 200 | 10 | 19 | 60 | OK | 5 | OK | OK |
| Comparative Example 21 | no grooves | | | 47 | — | NG | 5 | OK | NG |
| Example 24 | 18 | 200 | 10 | 18 | 62 | OK | 5 | OK | OK |

As can be seen from the results shown in Tables 2A and 2B, it is found that in Examples 1 to 24 using the manufacturing method of the galvannealed steel sheet according to this embodiment, the alloying completion time is reduced by 20% or more, and the alloying rate is improved as compared with Comparative Examples 1 and 8 to 21 subjected to no surface processing. Examples 1 to 10 in which the compositions of the steel sheets are common, Examples 5 and 6 in which both the depth and the interval are within the preferable range have a particularly short alloying time and the most excellent external appearance.

Specifically, it is found that in Comparative Examples 1 and 8 to 21 in which no grooves are formed in the steel sheet after hot rolling and pickling, the alloying time is not reduced as compared with Examples 1 to 24. In Comparative Examples 2 to 7 which are different from the manufacturing method of the galvannealed steel sheet according to this embodiment in either the depth or interval of the grooves or the width of the opening portion, the alloying time is not reduced by 20% or more as compared with Examples 1 to 24.

In Comparative Example 4, since the interval was narrow with respect to the depth of the grooves, the grooves remained after cold rolling. For this reason, a stripe pattern was formed to such an extent that the hot-dip galvanized steel sheet had poor external appearance. Furthermore, since the strain was not sufficiently accumulated, the alloying promotion effect was reduced, and the alloying time was increased. In Comparative Example 5, since the interval between the grooves was too wide, a stripe pattern was formed to such an extent that the external appearance was poor. Furthermore, since the interval between the grooves was too wide, the area ratio of the region where a sufficient plastic strain was applied was too small, and the alloying time was increased. In Comparative Example 2, since the grooves were too shallow, a sufficient plastic strain was not applied, and the alloying time was increased. In Comparative Example 3, the grooves were too deep and remained after cold rolling. For this reason, a stripe pattern was formed to such an extent that the hot-dip galvanized steel sheet had poor external appearance. In Comparative Example 6, since the opening surface width of the grooves was too narrow, a sufficient strain could not be applied to the surface, and the alloying time was increased. In Comparative Example 7, since the opening surface width of the grooves was too wide, a large strain hardly occurred after cold rolling, and the grooves remained after cold rolling. Accordingly, a stripe pattern was formed to such an extent that the hot-dip galvanized steel sheet had poor external appearance, and the alloying time was not reduced.

The preferable embodiments of the invention have been described in detail with reference to the accompanying drawings, but the invention is not limited to such examples. It is apparent that a person having ordinary knowledge in the technical field to which the invention belongs can conceive various changes or modifications within the scope of the technical idea described in the claims. It is understood that these also belong to the technical scope of the invention.

BRIEF DESCRIPTION OF THE REFERENCE SYMBOLS

1: galvannealed steel sheet
10: steel sheet
11: groove
20: coating layer

What is claimed is:

1. A manufacturing method of a galvannealed steel sheet, the method comprising:
    forming on a surface of a steel sheet after hot rolling and pickling which contains, by mass %, C: 0.001% to 0.350%, Si: 0.001% to 2.500% or P: 0.001% to 0.100%, or a combination thereof, Mn: 0.10% to 3.00%, S: 0.001% to 0.010%, N: 0.0010% to 0.0065%, and sol. Al: 0.001% to 0.800% with a remainder comprising Fe and impurities, grooves having an opening surface width of 10 μm to 25 μm and a depth of 10 μm to 30 μm at intervals of 20 μm to 500 μm;
    cold rolling the steel sheet in which the grooves are formed at the intervals at a rolling reduction of 30% or more;
    reduction annealing the steel sheet after the cold rolling;
    immersing the steel sheet after the reduction annealing in a hot-dip galvanizing bath containing 0.10 mass % to 0.20 mass % of Al with a remainder comprising Zn and optional components, and adhering a hot-dip galvanized layer to the surface of the steel sheet; and
    heating the steel sheet to which the hot-dip galvanized layer is adhered, and alloying the steel sheet with the hot-dip galvanized layer.

2. The manufacturing method of a galvannealed steel sheet according to claim 1,
    wherein the steel sheet further contains, by mass %, one or more of Cr: 0.01% to 0.50%, Ti: 0.01% to 0.10%, V: 0.01% to 0.10%, Nb: 0.01% to 0.10%, Ni: 0.01% to 1.00%, Cu: 0.01% to 1.00%, Mo: 0.01% to 1.00%, and B: 0.0003% to 0.0050%.

3. The manufacturing method of a galvannealed steel sheet according to claim 1,
    wherein a forming pattern of the grooves is a linear pattern extending in a sheet travelling direction or a sheet width direction of the steel sheet.

4. The manufacturing method of a galvannealed steel sheet according to claim 1,
    wherein the grooves are formed by irradiating the surface of the steel sheet with a laser.

5. The manufacturing method of a galvannealed steel sheet according to claim 1,
    wherein the grooves are formed by rolling the steel sheet with a roll in which projections corresponding to the grooves are formed on an outer circumferential surface.

6. The manufacturing method of a galvannealed steel sheet according to claim 2,
    wherein a pattern formed by the grooves is a linear pattern extending in a sheet travelling direction or a sheet width direction of the steel sheet.

7. The manufacturing method of a galvannealed steel sheet according to claim 2,
    wherein the grooves are formed by irradiating the surface of the steel sheet with a laser.

8. The manufacturing method of a galvannealed steel sheet according to claim 3,
    wherein the grooves are formed by irradiating the surface of the steel sheet with a laser.

9. The manufacturing method of a galvannealed steel sheet according to claim 6,
    wherein the grooves are formed by irradiating the surface of the steel sheet with a laser.

10. The manufacturing method of a galvannealed steel sheet according to claim 2,
    wherein the grooves are formed by rolling the steel sheet with a roll in which projections corresponding to the grooves are formed on an outer circumferential surface.

11. The manufacturing method of a galvannealed steel sheet according to claim 3,
    wherein the grooves are formed by rolling the steel sheet with a roll in which projections corresponding to the grooves are formed on an outer circumferential surface.

12. The manufacturing method of a galvannealed steel sheet according to claim 6,
    wherein the grooves are formed by rolling the steel sheet with a roll in which projections corresponding to the grooves are formed on an outer circumferential surface.

* * * * *